United States Patent
Kanade et al.

(10) Patent No.: US 9,000,661 B2
(45) Date of Patent: Apr. 7, 2015

(54) ENERGY EFFICIENT LIGHT SOURCE COMPRISING PHOTOLUMINESCENT MATERIAL AND A SELECTIVE MIRROR

(71) Applicant: I2iC Corporation, Foster City, CA (US)

(72) Inventors: Udayan Kanade, Pune (IN); Gaurav Kulkarni, Pune (IN); Karthikk Sridharan, Minneapolis, MN (US); Manas Alekar, Mountain View, CA (US); Manohar Joshi, Pune (IN); Sanat Ganu, Pune (IN); Balaji Ganapathy, Santa Clara, CA (US)

(73) Assignee: I2iC Corporation, Foster City, CA (US)

( * ) Notice: Subject to any disclaimer, the term of this patent is extended or adjusted under 35 U.S.C. 154(b) by 5 days.

(21) Appl. No.: 14/096,498

(22) Filed: Dec. 4, 2013

(65) Prior Publication Data
US 2014/0091703 A1    Apr. 3, 2014

Related U.S. Application Data

(63) Continuation of application No. 13/453,183, filed on Apr. 23, 2012, now Pat. No. 8,629,604.

(51) Int. Cl.
```
F21V 9/00      (2006.01)
H01J 61/00     (2006.01)
F21V 9/16      (2006.01)
F21V 8/00      (2006.01)
G02F 1/1335    (2006.01)
```

(52) U.S. Cl.
CPC ... *F21V 9/00* (2013.01); *F21V 9/16* (2013.01);
*G02B 6/005* (2013.01); *G02F 1/133617* (2013.01); *H01J 61/00* (2013.01); *G02F 1/133553* (2013.01); *G02F 1/133615* (2013.01); *G02F 1/13362* (2013.01); *G02F 1/133621* (2013.01); *G02F 2203/34* (2013.01)

(58) Field of Classification Search
CPC ............... F21V 9/00; F21V 9/16; H01J 61/00
USPC .................................................. 313/483, 484
See application file for complete search history.

(56) References Cited

U.S. PATENT DOCUMENTS

| | | | |
|---|---|---|---|
| 6,295,106 B1 | 9/2001 | Fukuzawa et al. | |
| 6,594,062 B1 | 7/2003 | Weder et al. | |
| 7,196,391 B2 | 3/2007 | Hsieh | |
| 7,321,464 B2 | 1/2008 | Ouderkirk et al. | |
| 2002/0094533 A1 | 7/2002 | Hess et al. | |
| 2004/0264212 A1 | 12/2004 | Chung et al. | |

FOREIGN PATENT DOCUMENTS

| | | |
|---|---|---|
| JP | 62194228 A | 8/1987 |
| WO | WO 2007/072166 A2 | 12/2006 |
| WO | PCT/US2008/069367 | 9/2008 |

*Primary Examiner* — Elmito Breval

(57) ABSTRACT

An energy efficient light source comprising photoluminescent material and a selective mirror is disclosed. In an embodiment, a first light source emanates light of a particular spectrum, a layer of photoluminescent material surrounding the first light source absorbs light of the spectrum emanated by the first light source and emanates light of a different spectrum, and a selective mirror surrounding the layer of photoluminescent material reflects light emanated by the first light source and transmits light emanated by the photoluminescent material.

8 Claims, 13 Drawing Sheets

ENERGY EFFICIENT LIGHT SOURCE COMPRISING PHOTOLUMINESCENT MATERIAL AND A SELECTIVE MIRROR

The present application is a continuation of patent application Ser. No. 13/453,183 entitled "CAMERA BEHIND A PHOTOLUMINESCENT LIGHT SOURCE" filed on Apr. 23, 2012 at the USPTO, which in turn is a continuation of patent application Ser. No. 13/228,805 entitled "PHOTOLUMINESCENT LIGHT SOURCE WITH LENSES" filed on Sep. 9, 2011 at the USPTO, which in turn is a continuation of patent application Ser. No. 12/168,738 entitled "PHOTOLUMINESCENT LIGHT SOURCE" filed on Jul. 7, 2008 at the USPTO, which in turn claimed the benefit of and priority to Indian Provisional Patent Application Number 1282/MUM/2007 entitled "Multicolored Light Source" filed on Jul. 5, 2007.

FIELD

The present invention relates to a light source. More particularly, the invention relates to a photoluminescent light source.

BACKGROUND

Light sources often use photoluminescent material to convert light of a particular spectrum to light of another spectrum. For example, many fluorescent tubes and broad spectrum light emitting diodes use photoluminescent material. But, the efficiency of such light sources is less because not all light of the first spectrum can be converted to light of the second spectrum.

Multicolored light sources exist that light through filters imparting various colors. For example, backlit billboards, advertisements and signages are made in this way. Flat screen color displays illumination in the form of white light. The white light falls on the display such as a liquid crystal display which uses color filters to depict colors. Color filters reduce efficiency since a large amount of light is absorbed. Because of the color filters the transmittance of the display is very low.

Another color display comprises dyed nematic crystal panels stacked one after the other. White light is passed through them. Each layer subtracts some amount of the red, blue and green respectively from the white light according to the voltage applied to it and displays the colored image. This system is bulky, costly and suffers from parallax errors.

SUMMARY

An energy efficient light source comprising photoluminescent material and a selective mirror is disclosed. In an embodiment, a first light source emanates light of a particular spectrum, a layer of photoluminescent material surrounding the first light source absorbs light of the spectrum emanated by the first light source and emanates light of a different spectrum, and a selective mirror surrounding the layer of photoluminescent material reflects light emanated by the first light source and transmits light emanated by the photoluminescent material.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

Figure 1A:
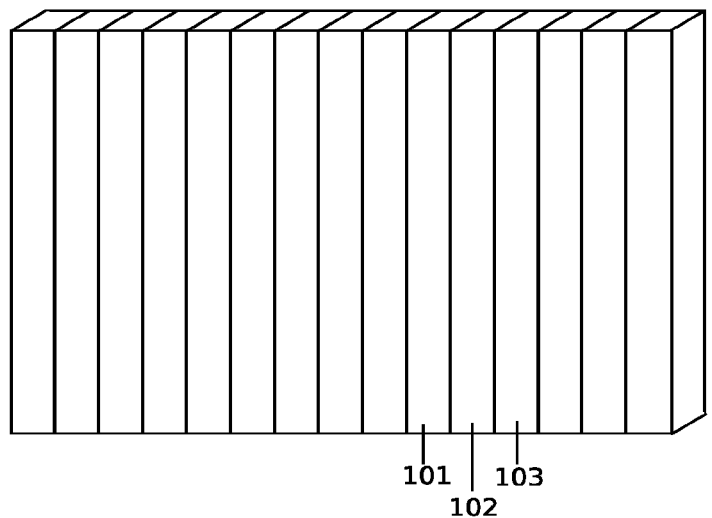
FIG. 1A illustrates a block diagram of an exemplary multicolored light source, according to an embodiment.

FIG. 1A illustrates a block diagram of an exemplary multicolored light source, according to an embodiment. The multicolored light source 199 has columnar light sources, such as columnar sources 101, 102 and 103. Light emanated from columnar sources 101-103 may be of different color. In an embodiment, columns emanate a repeating pattern of red, green and blue colors.

Figure 1B:
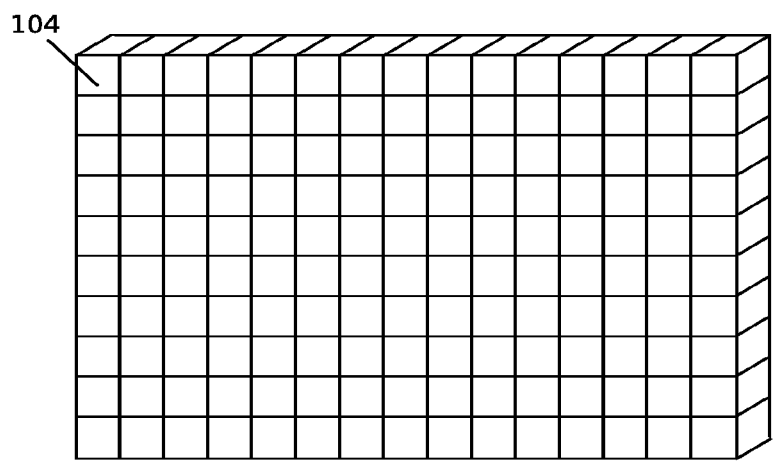
FIG. 1B illustrates a block diagram of an exemplary multicolored light source, according to an embodiment.

FIG. 1B illustrates a block diagram of an exemplary multicolored light source, according to an embodiment. The multicolored light source 198 has an array of light sources including element 104. Light source elements in the array of light sources may emanate different colors. In an embodiment, the light source elements emanate a repeating pattern of red, green and blue colors over the entire array. In another embodiment, the light sources emanate various colors so that the light source 198 displays a predetermined image. In an embodiment, the light source elements of the array of light sources in system 198 are of shapes such as square, rectangular, hexagonal, triangular etc.

Figure 2A:
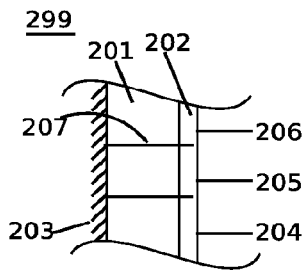
FIG. 2A illustrates a block diagram of a section of an exemplary photoluminescent light source viewed from the top, according to an embodiment.

FIG. 2A illustrates a block diagram of a section of an exemplary photoluminescent light source viewed from the top, according to an embodiment. The photoluminescent light source 299 comprises a light source 201 and an optional mirror 203. In an embodiment, light source 201 is a transparent light source. Mirror 203 may have metallic surfaces, distributed Bragg reflectors, hybrid reflectors, total internal reflectors, omni-direction reflectors or scattering reflectors. The light source 201 emanates light of a particular spectrum. A layer 202 made from photoluminescent material is placed in front of the light source 201. Photoluminescent material is any material exhibiting photoluminescence, which is the process of absorbing and reemitting light. Photoluminescent material includes phosphorescent material, fluorescent material, fluorescent dyes and scintillators. In an embodiment, layer 202 is a sparse or thin layer of photoluminescent material. Layer 202 may be printed, deposited or coated. In an embodiment, layer 202 has compartments such as compartments 204, 205 and 206. Layer 202 may comprise columnar compartments providing columnar photoluminescent light sources, or an array of compartments providing an array of photoluminescent light sources. At least one compartment comprises photoluminescent material emanating light of a particular spectrum. Different compartments may have different photoluminescent material, emanating light of different spectra. In an embodiment, the compartments may extend into more layers such as layer 201. The inter-compartment boundaries such as boundary 207 may comprise material that reflects, scatters or absorbs light so that light from a compartment does not enter another compartment.

Figure 2B:
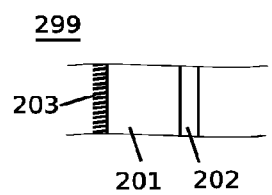
FIG. 2B illustrates a block diagram of a section of the photoluminescent light source viewed from a side, according to an embodiment.

FIG. 2B illustrates a block diagram of a section of the photoluminescent light source viewed from a side, according to an embodiment. The photoluminescent light source 299 has a light source 201 and an optional mirror 203. The light source 201 emanates light of a particular spectrum. A layer 202 made from photoluminescent material is placed in front of the light source 201. Light emanating from the light source 201 falls on the photoluminescent material in layer 202. This interaction of light emanated from light source 201 with photoluminescent material emanates light from the photoluminescent light source 299.

Figure 2C:
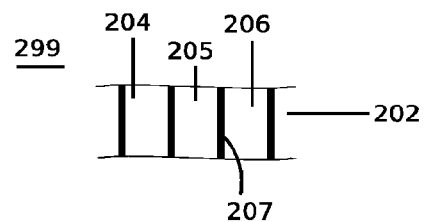
FIG. 2C illustrates a block diagram of a section of the photoluminescent light source, viewed from the front, according to an embodiment.

FIG. 2C illustrates a block diagram of a section of the photoluminescent light source, viewed from the front, according to an embodiment. The photoluminescent light source 299 has a light source and an optional mirror. The light source emanates light of a particular spectrum. A layer 202 including photoluminescent material is placed in front of the light source. Light emanating from the light source falls on the photoluminescent material layer 202. This interaction of light emanated by the light source with photoluminescent material which emanates light from the photoluminescent light source 299. In an embodiment, layer 202 has compartments such as compartments 204, 205 and 206. At least one compartment comprises photoluminescent material emanating light of a particular spectrum. Different compartments may have different photoluminescent material, emanating light of different spectra.

Figure 3A:
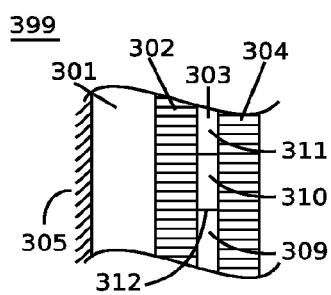
FIG. 3A illustrates a block diagram of a section of an exemplary photoluminescent light source viewed from the top, according to an embodiment.

FIG. 3A illustrates a block diagram of a section of an exemplary photoluminescent light source viewed from the top, according to an embodiment. The photoluminescent light source 399 has a light source 301 and an optional mirror 305. In an embodiment, light source 301 is a transparent light source. Mirror 305 may have metallic surfaces, distributed Bragg reflectors, hybrid reflectors, total internal reflectors, omni-direction reflectors or scattering reflectors. The light source 301 emanates light of a particular spectrum. A selective mirror 302 is placed in front of the light source 301. Selective mirror 302 is an optical device that primarily transmits light of a particular spectrum while primarily reflecting light of a different spectrum. The selective mirror 302 may have a dichroic filter, a dichroic mirror, a dielectric filter, a multilayer dielectric filter, a Bragg reflector, or a layer comprising particles having different optical properties for different wavelengths of light, such as different coefficients of scattering or different refractive index. The selective mirror 302 transmits light having the particular spectrum which is generated by the light source 301. The selective mirror 302 reflects light generated by photoluminescent material in layer 303 which is placed in front of the selective mirror 302. Selective mirror 302 may have one or more dichroic filters which have the required transmission and reflection characteristics. The layer 303 made from photoluminescent material may have compartments such as compartments 309, 310 and 311. The layer 303 may have columnar compartments providing columnar photoluminescent light sources, or an array of compartments providing an array of photoluminescent light sources. Each compartment may contain photoluminescent material emanating light of a particular spectrum. In an embodiment, the compartments may extend into more layers such as 301, 302 and 304. The inter-compartment boundaries such as boundary 312 may have material that reflects, scatters or absorbs light so that light from a compartment does not enter another compartment. A selective mirror 304 is placed in front of the layer 303. The selective mirror 304 reflects light having the particular spectrum which is generated by the light source 301, while transmitting the light generated by the photoluminescent material in layer 303.

Figure 3B:
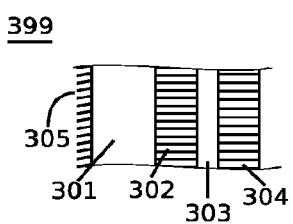
FIG. 3B illustrates a block diagram of a section of an exemplary photoluminescent light source viewed from a side, according to an embodiment.

FIG. 3B illustrates a block diagram of a section of an exemplary photoluminescent light source viewed from a side, according to an embodiment. The photoluminescent light source 399 has a light source 301 and an optional mirror 305. The light source 301 emanates light of a particular spectrum. A selective mirror 302 is placed in front of the light source 301. A layer 303 comprising photoluminescent material is placed in front of the selective mirror 302. A selective mirror 304 is placed in front of the layer 303.

Figure 3C:
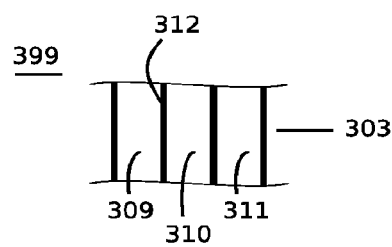
FIG. 3C illustrates a block diagram of a section of an exemplary photoluminescent light source, viewed from the front, according to an embodiment.

FIG. 3C illustrates a block diagram of a section of an exemplary photoluminescent light source, viewed from the front, according to an embodiment. The photoluminescent light source 399 has a light source and an optional mirror. The light source emanates light of a particular spectrum. A selective mirror is placed in front of the light source. A layer 303 made from photoluminescent material is placed in front of the selective mirror. The layer 303 may have compartments such as compartments 309, 310 and 311. The layer 303 may have columnar compartments or an array of compartments. Each compartment may contain photoluminescent material emanating light of a particular spectrum. The inter-compartment boundaries such as boundary 312 may have material that reflects, scatters or absorbs light so that light from a compartment does not enter another compartment. A selective mirror is placed in front of the layer 303.

Figure 4:
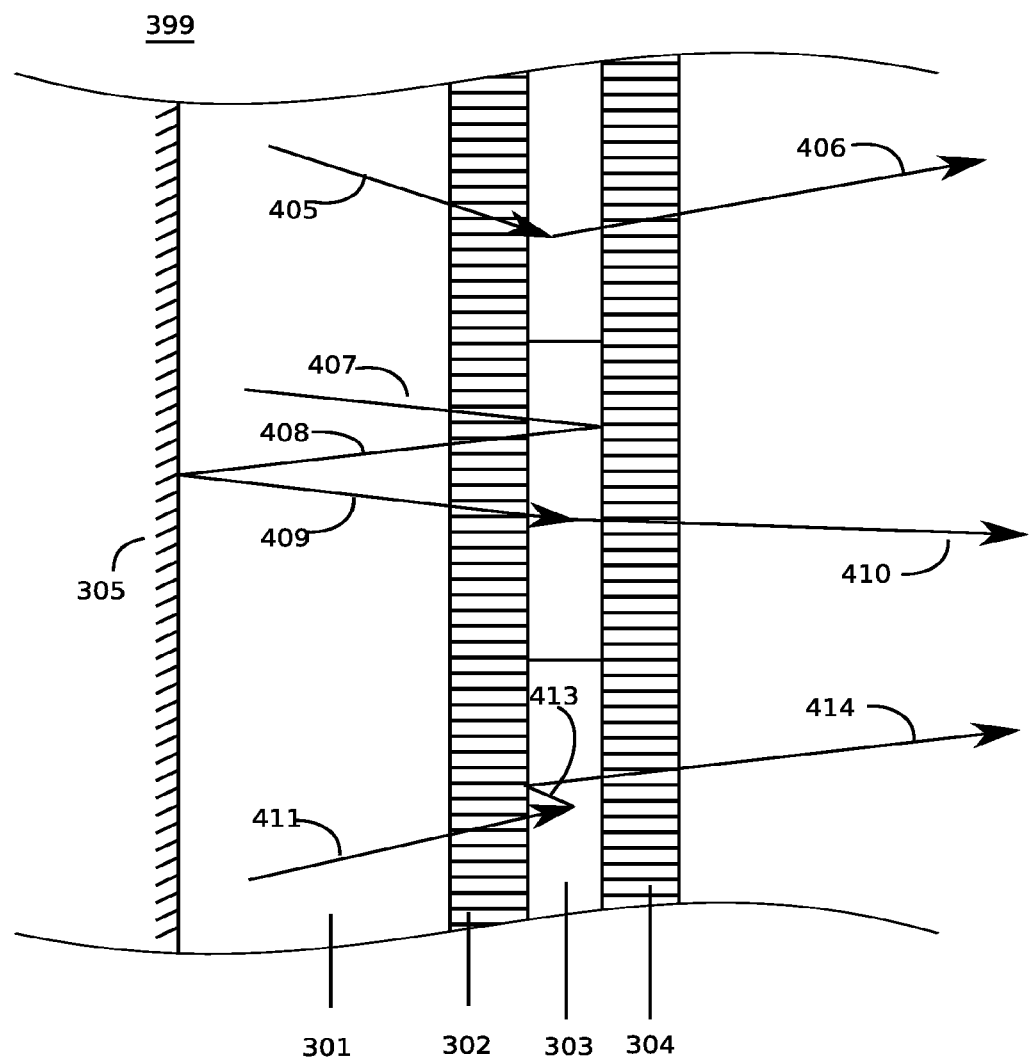
FIG. 4 illustrates an enlarged view of a section of an exemplary photoluminescent light source, viewed from the top, according to an embodiment.

FIG. 4 illustrates an enlarged view of a section of an exemplary photoluminescent light source, viewed from the top, according to an embodiment. Light 405 is an exemplary light ray from the light source 301. Light 405 passes through the selective mirror 302 and is incident on the layer 303 containing photoluminescent material. Light 405 interacts with the photoluminescent material present in layer 303 to give light 406. In an embodiment, light 406 has a spectrum which resides in the visible range of light spectrum. Light 406 passes through the selective mirror 304 and emanates from the photoluminescent light source 399. Light 411 is another exemplary ray of light emanated from the light source 301. Light 411 passes through the selective mirror 302. Light 411 interacts with the photoluminescent material of layer 403. This interaction gives rise to light 413. In an embodiment, light 413 has a spectrum which resides in the visible range of light spectrum. Light 413 emanates in a direction such that it is incident on the selective mirror 302. The selective mirror 302 reflects light 413. Reflected light 414 passes through the selective mirror 304 and emanates from the photoluminescent light source 399.

Light 407 is another exemplary ray of light emanated from the light source 301. Light 407 passes through the selective mirror 302. Light 407 does not interact with the photoluminescent material layer 303 and is incident on the selective mirror 304. Light 407 is reflected by the selective mirror 304 as light 408. Light 408 travels through the selective mirror 302 without interacting with the photoluminescent material in layer 303. In the case that light source 301 is transparent, light 408 passes through it and gets reflected from the mirror surface 305 to give recycled light 409. In the case that light source 301 is not transparent, light 408 enters the light source 301 and after multiple reflections and refractions, emanates from the light source 301 again as recycled light 409. Recycled light 409 once again passes through the selective mirror 302 and interacts with the photoluminescent material in layer 303. Light 407 may undergo multiple reflections between selective mirror 304 and mirror 305 before interacting with the photoluminescent material in the layer 303. Interaction of light 409 with the photoluminescent material gives rise to light 410. In an embodiment, light 410 has a spectrum which resides in the visible range of light spectrum. Light 410 passes through the selective mirror 304 and emanates from the photoluminescent light source 399. In the case that layer 303 has compartments with different photoluminescent material, the photoluminescent light source 399 emanates light that is differently colored in different regions.

Figure 5A:
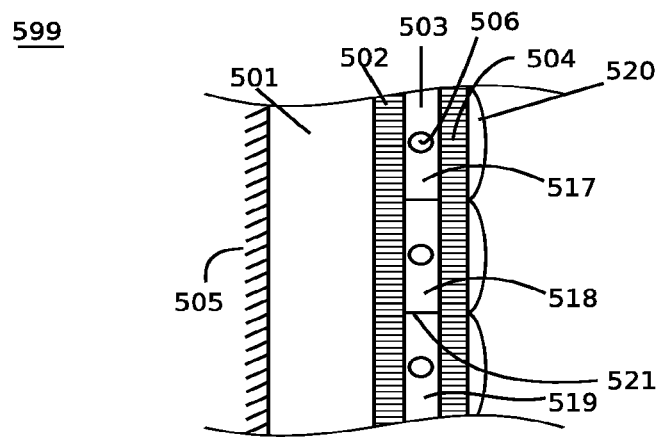
FIG. 5A illustrates a block diagram of a section of an exemplary photoluminescent light source, viewed from the top, according to an embodiment.

FIG. 5A illustrates a block diagram of a section of an exemplary photoluminescent light source, viewed from the top, according to an embodiment. The photoluminescent light source 599 has a light source 501 and an optional mirror 505. In an embodiment, light source 501 is a transparent light source. Mirror 505 may have metallic surfaces, distributed Bragg reflectors, hybrid reflectors, total internal reflectors, omni-direction reflectors or scattering reflectors. Light source 501 emanates light of a particular spectrum. A selective mirror 502 is placed in front of the light source 501. The selective mirror 502 transmits light having the particular spectrum which is generated by the light source 501. The selective mirror 502 reflects light generated by photoluminescent material in layer 503 which is placed in front of the selective mirror 502.

The layer 503 is primarily transparent with small regions 506 of photoluminescent material. The layer 503 which contains photoluminescent material may have compartments such as compartments 517, 518 and 519. The layer 503 may have columnar compartments or an array of compartments. Each compartment may contain photoluminescent material emanating light of a particular spectrum. In an embodiment, the compartments may extend into more layers such as 501, 502 and 504. The inter-compartment boundaries such as boundary 521 may have material that reflects, scatters or absorbs light so that light from a compartment does not enter another compartment. A selective mirror 504 is placed in front of the layer 503. The selective mirror 504 reflects light having the particular spectrum which is generated by the light source 501, while transmitting the light generated by the photoluminescent material in layer 503. In an embodiment, a sheet of collimating lenses 520 is placed in front of the selective mirror 504. In the case that layer 503 has regions with different photoluminescent material, the photoluminescent light source 599 emanates light that has different colors in different regions.

Figure 5B:
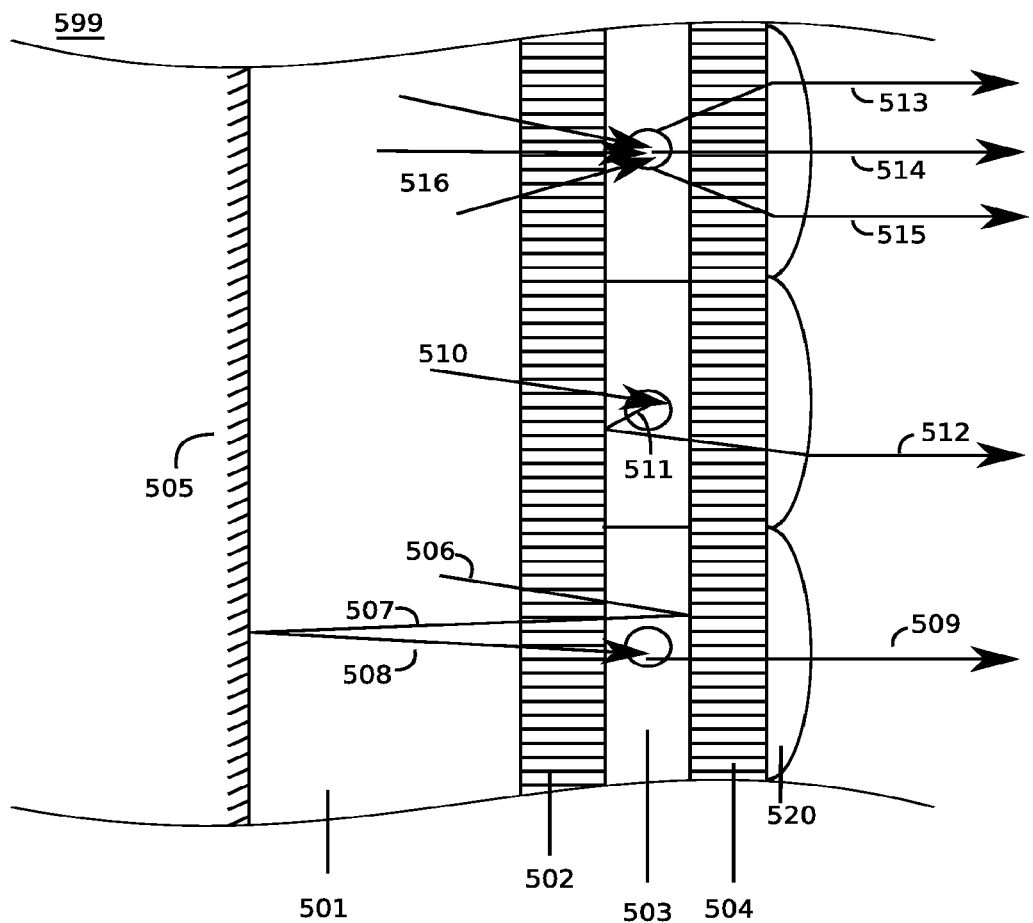
FIG. 5B illustrates an enlarged view of a section of an exemplary photoluminescent light source, viewed from the top, according to an embodiment.

FIG. 5B illustrates an enlarged view of a section of an exemplary photoluminescent light source, viewed from the top, according to an embodiment. Light 516 from the light source 501 passes through the selective mirror 502 and is incident on the layer 503 having regions of photoluminescent material. Some rays of light fall on the regions of photoluminescent material. The interaction of exemplary light 516 with photoluminescent material region causes light to be emanated from the photoluminescent material. Light 513, 514 and 515 are exemplary rays resulting from interaction of light 516 with photoluminescent material. In an embodiment, light 513, 514 and 515 are light rays whose spectrum resides in the visible range of light spectrum. Light rays 513, 514 and 515 pass through the collimating lens sheet 520 and emerge as a collimated light beam. Light 511 is an exemplary light ray emanating from the photoluminescent material of layer 503 resulting from the interaction of light 510 with photoluminescent material in layer 503. Light 511 is emanated such that it is incident on the selective mirror 502. Light 511 gets reflected from the selective mirror 502 and passes through the selective mirror 504. Light 511 passes through the collimating lens sheet 520 and emerges as light 512. Thus light emanating from the regions comprising photoluminescent material emerges from photoluminescent light source 599 in the form of a collimated beam of light.

Light 506 is exemplary light emanated from the light source 501. Light 506 passes through the selective mirror 502 but does not fall on the photoluminescent material region. Light 506 is incident on the selective mirror 504. The selective mirror 504 reflects the light 506 to give reflected light 507. Reflected light 507 passes through layer 503 without interacting with the photoluminescent material regions. Light 507 then passes through the selective mirror 502. Light 507 passes through the light source 501.

In the case that light source 501 is transparent, light 507 passes through the transparent light source 501 and gets reflected by the mirror 505 as recycled light 508. In the case that light source 501 is not transparent, light 507 enters the light source 501 and after multiple reflections and refractions, emanates from the light source 501 again as recycled light 508. Recycled light 508 passes through the selective mirror 502 and falls on the photoluminescent material region 503. Light 508 may perform several reflections between mirror 505 and selective mirror 504 before interacting with the photoluminescent material region 503. Light 508 interacts with photoluminescent material in region 503 to give light 509. In an embodiment, light 509 has a spectrum which resides in the visible range of light spectrum. Light 509 emanating from photoluminescent material in region 503 passes through the selective mirror 504. Light 509 passes through the collimating lens sheet 520 and emerges from the photoluminescent light source 599. In the case that layer 503 has regions with different photoluminescent material, the photoluminescent light source 599 emanates light that has different colors in different regions.

Figure 6A:
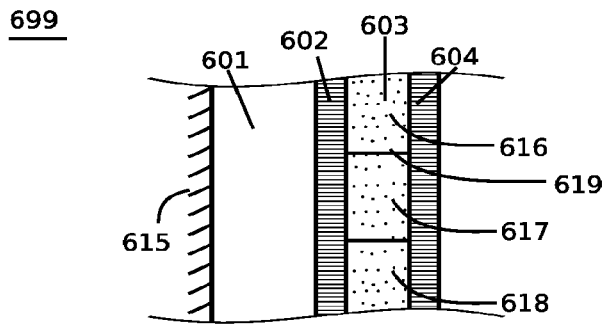
FIG. 6A illustrates a block diagram of a section of an exemplary photoluminescent light source, viewed from the top, according to an embodiment.

FIG. 6A illustrates a block diagram of a section of an exemplary photoluminescent light source, viewed from the top, according to an embodiment. The photoluminescent light source 699 has a light source 601 and an optional mirror 605. In an embodiment, light source 601 is a transparent light source. Mirror 605 may be metallic surfaces, distributed Bragg reflectors, hybrid reflectors, total internal reflectors, omni-direction reflectors or scattering reflectors. Light source 601 emanates light of a particular spectrum. A selective mirror 602 is placed in front of the light source 601. The selective mirror 602 transmits light having the particular spectrum which is generated by the light source 601. The selective mirror 602 reflects light generated by photoluminescent material in layer 603 which is placed in front of the selective mirror 602. The layer 603 has a transparent base material with dispersed photoluminescent particles. The transparent base material in layer 603 may be made of glass or transparent plastics such as acrylic, polycarbonate, etc. The layer 603 may have compartments such as compartments 616, 617 and 618. The layer 603 may have columnar compartments or an array of compartments. Each compartment may contain photoluminescent material emanating light of a particular spectrum. In an embodiment, the compartments may extend into more layers such as 601, 602 and 604. The inter-compartment boundaries such as boundary 619 may be made from material that reflects, scatters or absorbs light so that light from a compartment does not enter another compartment. A selective mirror 604 is placed in front of the layer 603. The selective mirror 604 reflects light having the particular spectrum which is generated by the light source 601, while transmitting the light generated by the photoluminescent material in layer 603. In the case that layer 603 has compartments with different photoluminescent material, the photoluminescent light source 699 emanates light that has different colors in different regions.

Figure 6B:
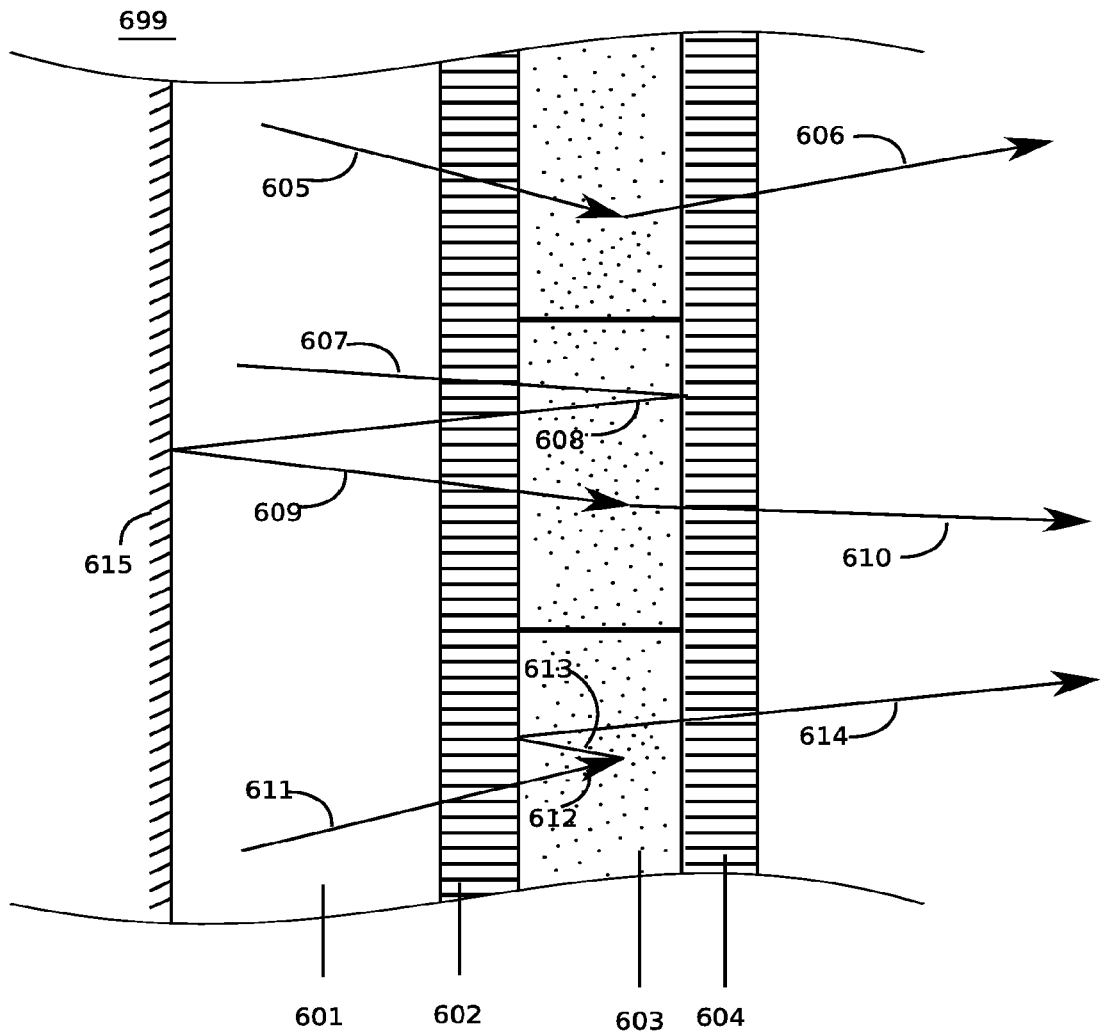
FIG. 6B illustrates an enlarged view of a section of an exemplary photoluminescent light source, viewed from the top, according to an embodiment.

FIG. 6B illustrates an enlarged view of a section of an exemplary photoluminescent light source, viewed from the top, according to an embodiment. Light 605 is an exemplary light ray from the light source 601. Light 605 passes through the selective mirror 602 and is incident on the layer 603 comprising photoluminescent material. Light 605 interacts with the photoluminescent material present in layer 603 to give light 606. In an embodiment, light 606 has a spectrum which resides in the visible range of light spectrum. Light 606 passes through the selective mirror 604 and emanates from the photoluminescent light source 699.

Light 611 is another exemplary ray of light emanated from the light source 601. Light 611 passes through the selective mirror 602. Light 611 then interacts with the photoluminescent material of layer 603 to render light 613. In an embodiment, light 613 has a spectrum which resides in the visible range of light spectrum. Light 613 emanates in a direction such that it is incident on the selective mirror 602. The selective mirror 602 reflects light 613. Reflected light 614 passes through the selective mirror 604 and emanates from the photoluminescent light source 699. Light 607 depicts another exemplary ray of light emanated from the light source 601. Light 607 passes through the selective mirror 602. Light 607 does not interact with the photoluminescent material layer 603 and is incident on the selective mirror 604. Light 607 gets reflected by the selective mirror 604 as light 608.

Light 608 travels through the selective mirror 602 without interacting with the dispersed photoluminescent material in layer 603. In the case that light source 601 is transparent, light 608 passes through it and is reflected from the mirror surface 605 as recycled light 609. In the case that light source 601 is not transparent, light 608 enters the light source 601 and after multiple reflections and refractions, emanates from the light source 601 again as recycled light 609. Reflected light 609 once again passes through the selective mirror 602 and interacts with the photoluminescent material in layer 603. Light 607 may undergo multiple reflections between selective mirror 604 and mirror 605 before it interacts with the photoluminescent material in layer 603 to render light 610.

In an embodiment, light 610 has a spectrum which resides in the visible range of light spectrum. Light 610 passes through the selective mirror 604 and emanates from the photoluminescent light source 699. In the case that layer 603 has compartments with different photoluminescent material, the photoluminescent light source 699 emanates light of different colors in different regions.

Figure 7A:
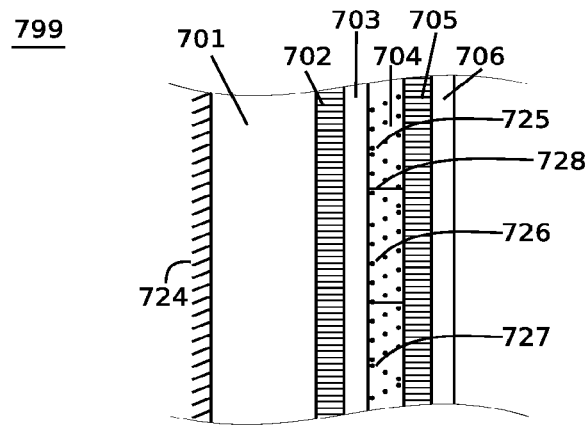
FIG. 7A illustrates a block diagram of a section of an exemplary photoluminescent light source, viewed from the top, according to an embodiment.

FIG. 7A illustrates a block diagram of a section of an exemplary photoluminescent light source, viewed from the top, according to an embodiment. The photoluminescent light source 799 has a light source 701 and an optional mirror 724. In an embodiment, the light source 701 is a transparent light source. Mirror 724 may have metallic surfaces, distributed Bragg reflectors, hybrid reflectors, total internal reflectors, omni-direction reflectors or scattering reflectors. Light source 701 emanates light of a particular spectrum. A selective mirror 702 is placed in front of the light source 701. The selective mirror 702 transmits light having a particular spectrum which is generated by the light source 701. The selective mirror 702 reflects light generated by photoluminescent material in layer 704 which is placed in front of the selective mirror 702.

A quarter wave retarder 703 is placed in front of the selective mirror 702. In an embodiment, the quarter wave retarder is placed between layer 704 and selective mirror 705 or between selective mirror 705 and reflecting polarizer 706. A layer 704 having a transparent base material with dispersed photoluminescent particles is placed in front of the quarter wave retarder. The transparent base material in layer 704 may be made of glass or transparent plastics such as acrylic, polycarbonate etc. In another embodiment, the layer 704 does not contain transparent material other than the photoluminescent material itself. In yet another embodiment, layer 704 is primarily transparent and comprises regions of photoluminescent material. In this embodiment, a sheet of collimating lenses may be used to collimate the light produced by the spots.

The layer 704 may have compartments such as compartments 725, 726 and 727. The layer 704 may have columnar compartments or an array of compartments. Each compartment may contain photoluminescent material emanating light of a particular spectrum. In an embodiment, the compartments may extend into more layers such as 701, 702, 703, 705 and 706. The inter-compartment boundaries such as boundary 728 may comprise material that reflects, scatters or absorbs light so that light from a compartment does not enter another compartment. A selective mirror 705 is placed in front of the layer 704. The selective mirror 705 reflects light having a particular spectrum which is generated by the light source 701, while transmitting the light generated by the photoluminescent material in layer 704.

A reflecting polarizer 706 is placed in front of the selective mirror 705. In an embodiment, the reflecting polarizer 706 reflects one linearly polarized component of light and passes the other linearly polarized component of light. In another embodiment, the reflecting polarizer 706 reflects one circularly polarized component of light and passes the other circularly polarized component of light. The photoluminescent light source 799 is a polarized light source. In the case that layer 704 has compartments with different photoluminescent material, the photoluminescent light source 799 emanates polarized light that is differently colored in different regions.

Figure 7B:
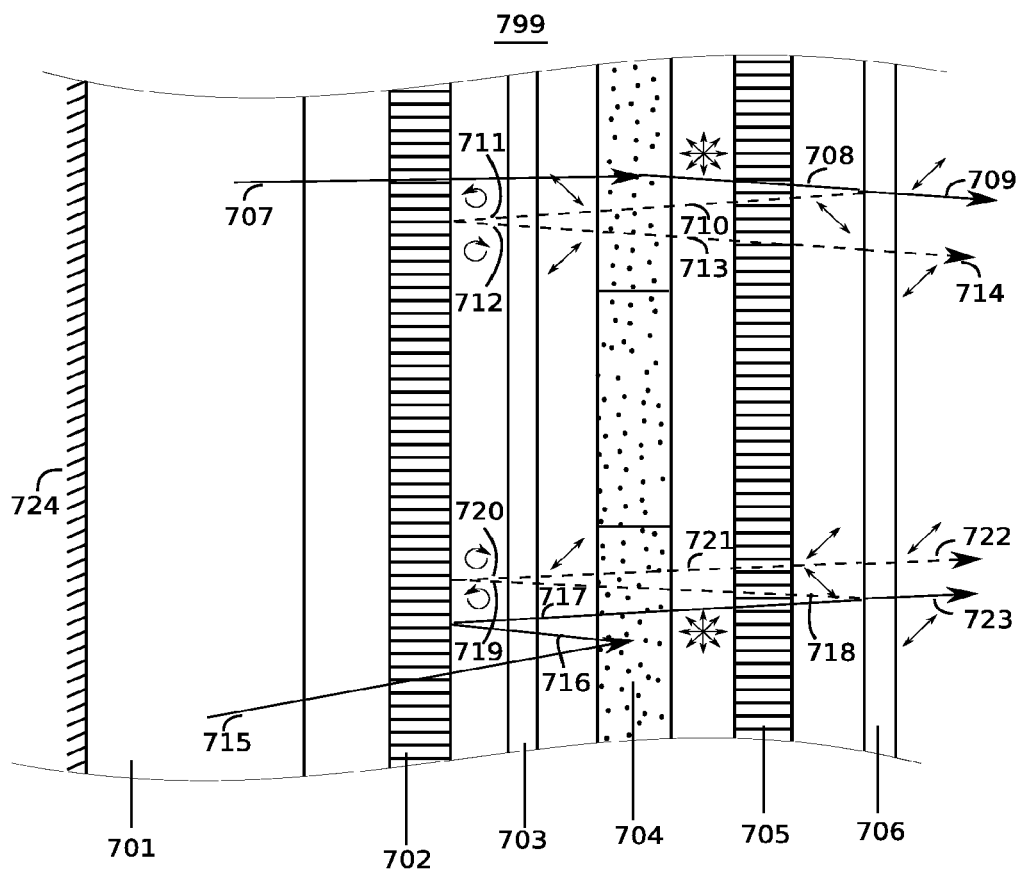
FIG. 7B illustrates an enlarged view of a section of an exemplary photoluminescent light source, according to an embodiment.

FIG. 7B illustrates an enlarged view of a section of an exemplary photoluminescent light source, according to an embodiment. Light from the light source 701 interacts with the photoluminescent material in layer 704 and gives out light. Light from the light source 701 may undergo multiple reflections due to mirror 724, selective mirror 705 and light source 701 if the light source 701 is not transparent, before it interacts with photoluminescent material in layer 704. Light from the photoluminescent material may emanate towards the selective mirror 702 or the selective mirror 705. These cases are discussed below using exemplary light rays 707 and 715.

Exemplary light 707 emanated from the light source 701 passes through the selective mirror 702 and the quarter wave retarder 703. Light 707 interacts with photoluminescent material in layer 704 to give light 708, which is unpolarized or partially polarized. In an embodiment, light 708 has a spectrum which resides in the visible range of the light spectrum. Light 708 passes through the selective mirror 705. Light 708 falls on the reflecting linear polarizer 706. The reflecting linear polarizer 706 transmits one linearly polarized light component 709 of light 708. Light component 710 of light 708, polarized perpendicular to light component 709, gets reflected from the reflecting linear polarizer 706. Reflected linearly polarized light component 710 passes through the selective mirror 705 and through the layer 704. Linearly polarized light 710 passes through the quarter wave retarder 703 and becomes circularly polarized light 711. Circularly polarized light 711 gets reflected from the selective mirror 702 to give circularly polarized light 712 polarized in a reverse direction.

Circularly polarized light 712 passes through the quarter wave retarder 703 and becomes light 713, linearly polarized in a direction perpendicular to that of light 710. Linearly polarized light 713 passes through layer 704 and selective mirror 705. Linearly polarized light is polarized in a direction which is transmitted by the reflecting polarizer 706. Thus, linearly polarized light 713 passes through reflecting polarizer 706 and emanates from the photoluminescent light source 799 as linearly polarized light 714 polarized similarly to light 709.

Exemplary light 715 emanated from the light source 701 passes through the selective mirror 702 and the quarter wave retarder 703. Light 715 interacts with photoluminescent material in layer 704 to give light 716, which is unpolarized or partially polarized. In an embodiment, light 716 has a spectrum which resides in the visible range of the light spectrum. Light 716 which is emanated towards the selective mirror 702, passes through the quarter wave retarder 703. Light 716 is reflected from the selective mirror 702 as light 717, which is unpolarized or partially polarized. Light 717 passes through the quarter wave retarder and the primarily transparent layer 704. Light 717 passes through the selective mirror 705 and is incident on the reflecting polarizer 706. The reflecting linear polarizer 706 permits one linearly polarized light component 723 of light 717 to pass through it. Light component 718 of light 717 polarized perpendicular to light 723 is reflected from the reflecting linear polarizer 706. Linearly polarized light 718 passes through the selective mirror 705 and layer 704. Linearly polarized light 718 passes through the quarter wave retarder 703 and becomes circularly polarized light 719.

Circularly polarized light 719 is reflected from the selective mirror 702 as circularly polarized light 720 polarized in the reverse direction of light 719. Circularly polarized light 720 passes through the quarter wave retarder 703 and becomes light 721, linearly polarized in a direction perpendicular to that of light 718. Linearly polarized light 721 passes through layer 704 and selective mirror 705 and is incident on the reflecting polarizer 706. Linearly polarized light 721 is polarized in a direction which is transmitted by the reflecting polarizer 706. Thus, light 721 passes through the reflecting polarizer 706 and emerges from photoluminescent light source 799 as light 722 polarized similar to light 723. Thus, the photoluminescent light source 799 is a polarized light source. In the case that layer 704 has compartments with different photoluminescent material, the photoluminescent light source 799 emanates polarized light that is differently colored in different regions.

In an embodiment, layer 703 is a wave retarder but not necessarily a quarter wave retarder. In this case, not all light entering the wave retarder is converted to the correct polarization immediately. Yet, after multiple bounces between reflecting polarizer 706 and selective mirror 702, light will be polarized in the direction of the reflecting polarizer 706.

Figure 8A:
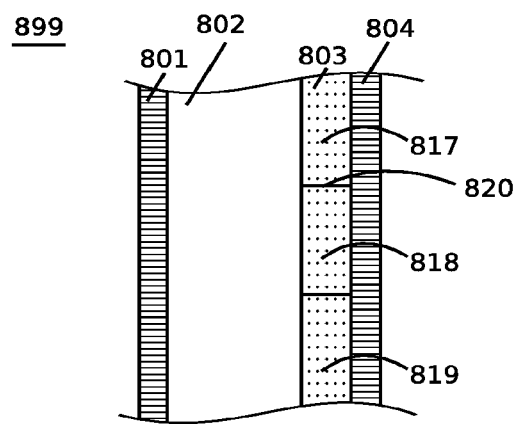
FIG. 8A illustrates a block diagram of a section of an exemplary transparent photoluminescent light source, viewed from the top, according to an embodiment.

FIG. 8A illustrates a block diagram of a section of an exemplary transparent photoluminescent light source, viewed from the top, according to an embodiment. The transparent photoluminescent light source 899 has a transparent light source 802. Light source 802 emanates light of a particular spectrum. A selective mirror 801 is placed behind the light source 802. The selective mirror 801 reflects light having the particular spectrum which is generated by the light source 802. The selective mirror 801 transmits light generated by photoluminescent material in layer 803 placed in front of it.

The layer 803 is made from photoluminescent material. In an embodiment, the layer 803 also has transparent material, in which the photoluminescent material may be dispersed or may be disposed in small regions. The layer 803 may have compartments such as compartments 817, 818 and 819. The layer 803 may have columnar compartments or an array of compartments. Each compartment may contain photoluminescent material emanating light of a particular spectrum. In an embodiment, the compartments may extend into more layers such as 801, 802 and 804. The inter-compartment boundaries such as boundary 820 may have material that reflects, scatters or absorbs light so that light from a compartment does not enter another compartment.

A selective mirror 804 is placed in front of the layer 803. The selective mirror 804 transmits light having the particular spectrum which is generated by the photoluminescent material. The selective mirror 804 reflects light generated by light source 802. In an embodiment, a selective mirror (not shown) which reflects light generated by photoluminescent material of layer 803 is placed between layer 803 and light source 802. The transparent photoluminescent light source 899, is a light source which is primarily transparent when viewed from its faces. In the case that layer 803 has compartments with different photoluminescent material, the transparent photoluminescent light source 899 emanates light has different colors in different regions.

Figure 8B:
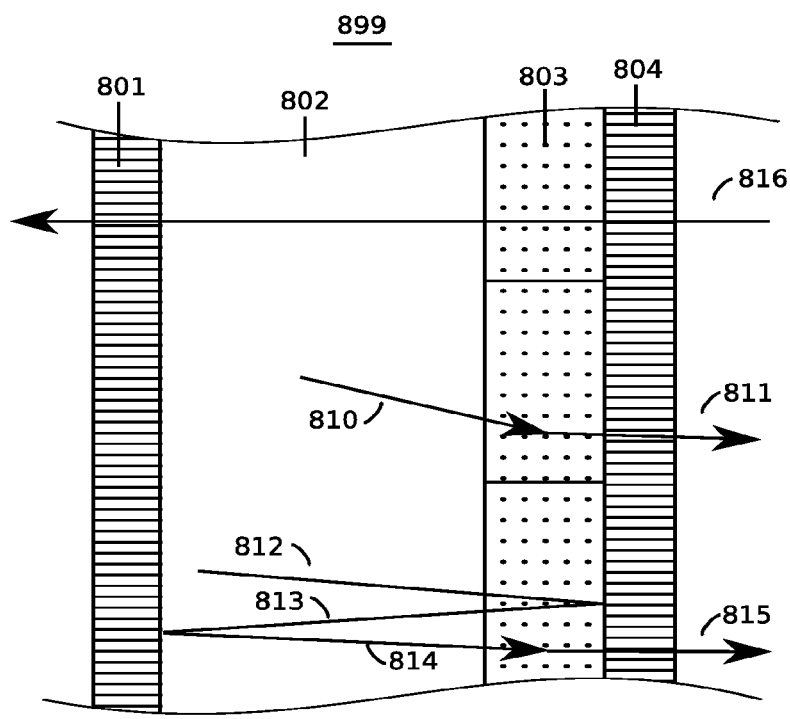
FIG. 8B illustrates an enlarged view of a block diagram of a section of an exemplary transparent photoluminescent light source, according to an embodiment.

FIG. 8B illustrates an enlarged view of a block diagram of a section of an exemplary transparent photoluminescent light source, according to an embodiment. Light 810 depicts an exemplary light ray emanated from the light source 802. Light 810 is incident on the layer 803 containing photoluminescent material. Light 810 interacts with photoluminescent material in layer 803 to render light 811. In an embodiment, light 811 has a spectrum which resides in the visible range of light spectrum. Light 811 passes through the selective mirror 804 and emanates from the transparent photoluminescent light source 899. Light 812 is another exemplary light ray emanated from the light source 802. Light 812 passes through the layer 803 without interacting with the photoluminescent material in the layer 803. Light 812 is reflected by selective mirror 804 as light 813. Light 813 passes through the layer 803. Light 813 passes through transparent light source 802 and is reflected by selective mirror 801 to give recycled light 814. Recycled light 814 interacts with the photoluminescent material in region 803 to render light 815. In an embodiment, light 815 has a spectrum which resides in the visible range of light spectrum. Light 815 passes through the selective mirror 804 and emanates from the transparent photoluminescent light source 899. Light 812 may undergo several reflections between the selective mirrors 801 and 804 before it interacts with the photoluminescent material in layer 803.

Light 816 is an exemplary light ray incident on one face of the transparent photoluminescent light source 899. Light 816 passes through the selective mirror 804, layer 803, light source 802 and selective mirror 801 and emerges from the other face of the system 899. Thus the transparent photoluminescent light source 899 is transparent to light incident on its face. In the case that layer 803 has compartments with different photoluminescent material, transparent photoluminescent light source 899 emanates light that has different colors in different regions.

Figure 9A:
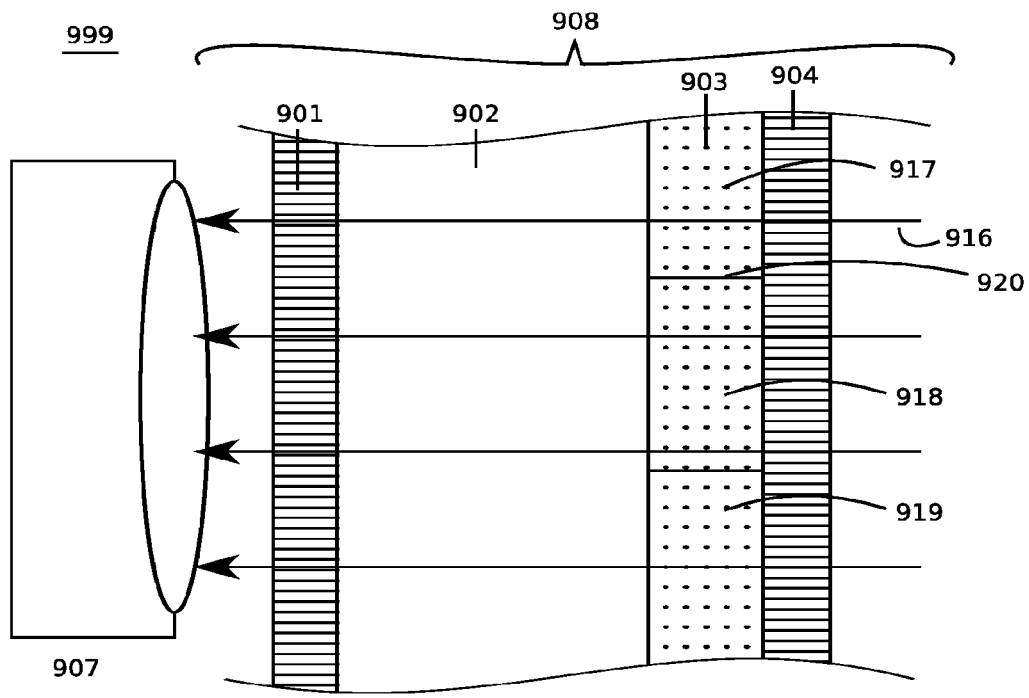
FIG. 9A illustrates a block diagram of an exemplary transparent photoluminescent light source in front of a camera and where the light source is not emanating light, according to an embodiment.

FIG. 9A illustrates a block diagram of an exemplary apparatus transparent photoluminescent light source in front of a camera and where the light source is not emanating light, according to an embodiment. The transparent photoluminescent light source 908 has a transparent light source 902 which emanates light of a particular spectrum. A selective mirror 901 is placed behind the light source 902. The selective mirror 901 transmits light of a spectrum detected by camera 907. The selective mirror 901 reflects light generated by light source 902 placed in front of it. The layer 903 includes photoluminescent material. In an embodiment, the layer 903 also has transparent material, in which the photoluminescent material may be dispersed or may be disposed in small regions.

The layer 903 may have compartments such as compartments 917, 918 and 919. The layer 903 may have columnar compartments or an array of compartments. Each compartment may contain photoluminescent material emanating light of a particular spectrum. In an embodiment, the compartments may extend into more layers such as 901, 902 and 904. The inter-compartment boundaries such as boundary 920 may have material that reflects, scatters or absorbs light so that light from a compartment does not enter another compartment. A selective mirror 904 is placed in front of the layer 903. The selective mirror 904 transmits visible light, while it reflects light generated by light source 902. Light 916 depicts exemplary light rays incident on one face of the transparent photoluminescent light source 908. Light 916 passes through the selective mirror 904, the layer 903, the transparent light source 902 and the selective mirror 901 and enters the camera 907, which captures an image. In an embodiment, the light source 902 is not emanating light when the camera 907 captures an image.

Figure 9B:
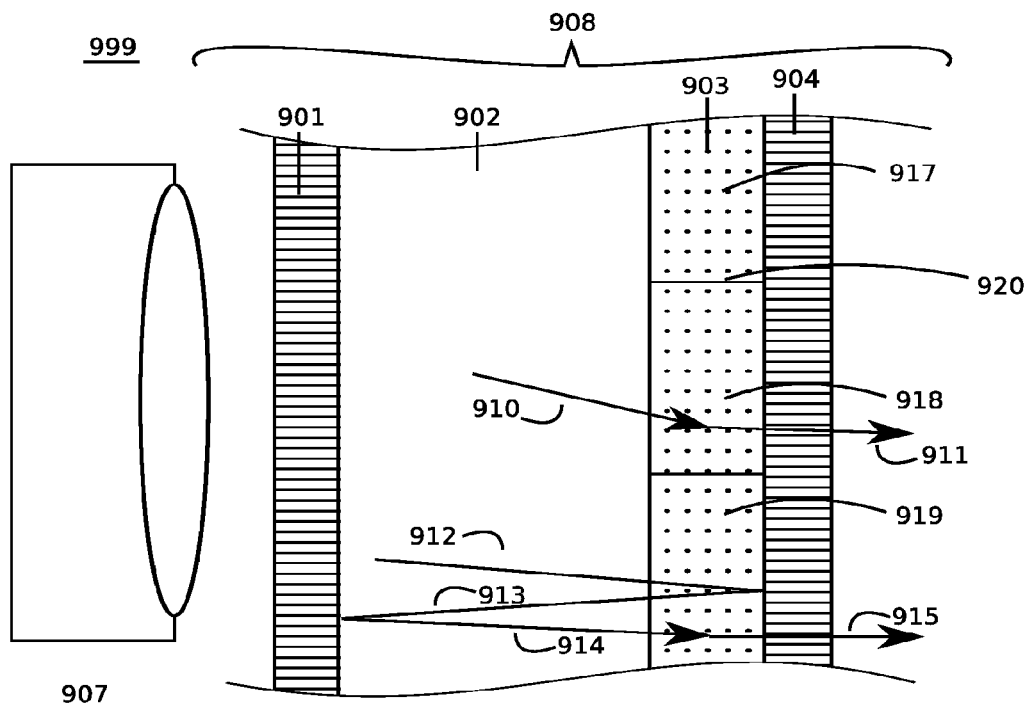
FIG. 9B illustrates a block diagram of exemplary transparent photoluminescent light source in front of a camera and where the light source is emanating light, according to an embodiment.

FIG. 9B illustrates a block diagram of exemplary transparent photoluminescent light source in front of a camera and where the light source is emanating light, according to an embodiment. The transparent photoluminescent light source 908 has a transparent light source 902 which emanates light of a particular spectrum. Selective mirror 901 is placed behind light source 902. Layer 903 has photoluminescent material and is placed in front of the light source 902. The layer 903 may have compartments such as compartments 917, 918 and 919. The layer 903 may have columnar compartments or an array of compartments. Each compartment may contain photoluminescent material emanating light of a particular spectrum. In an embodiment, the compartments may extend into more layers such as 901, 902 and 904. The inter-compartment boundaries such as boundary 920 may have material that reflects, scatters or absorbs light so that light from a compartment does not enter another compartment.

Light 910 is an exemplary light ray emanating from light source 902. Light 910 interacts with photoluminescent material in layer 903 to give light 911. In an embodiment, light 911 has a spectrum which resides in the visible range of light spectrum. Light 911 passes through the selective mirror 904 and emanates from the setup 999. Light 912 depicts another exemplary light ray emanated from the light source 902. Light 912 passes through the layer 903 without interacting with the photoluminescent material in it. Light 912 gets reflected from selective mirror 904 as light 913. Light 913 passes through the layer 903 and the transparent light source 902. Light 913 gets reflected from the layer 901 as light 914 and passes through the transparent light source 902. Light 914 is incident on the layer 903 containing photoluminescent material. Light 914 interacts with the photoluminescent material in region 903 to give light 915. In an embodiment, light 915 has a spectrum which resides in the visible range of light spectrum. Light 915 passes through the selective mirror 904 and emanates from the system 999. Light 912 may undergo several reflections between the selective mirrors 904 and 901 before interacting with the photoluminescent material in layer 903. In the case that layer 903 has compartments with different photoluminescent material, the apparatus 999 emanates light that is differently colored in different regions. In an embodiment, the camera 907 is not capturing an image when the light source 902 is emanating light.

Figure 10:
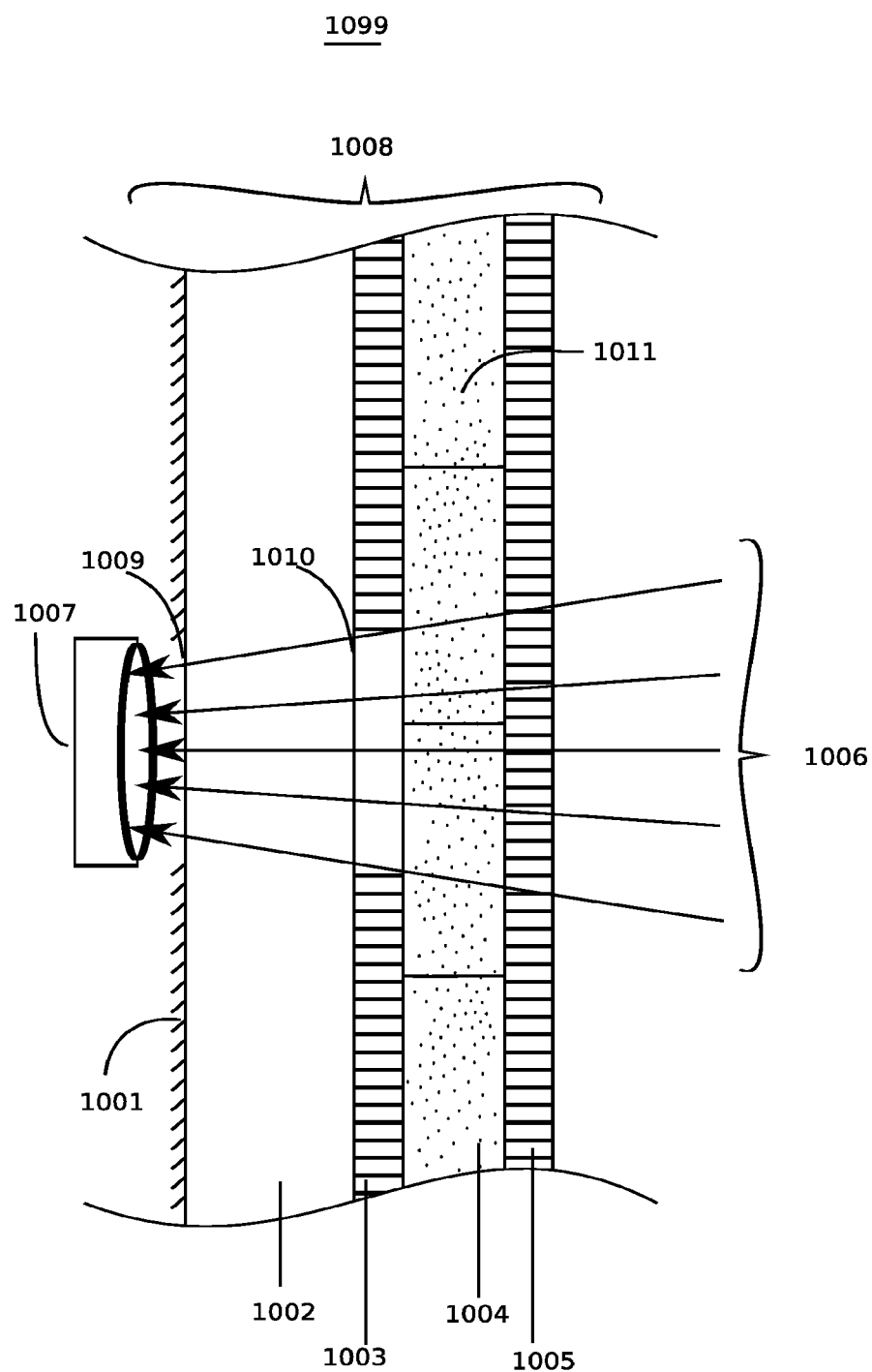
FIG. 10 illustrates a block diagram of an exemplary photoluminescent light source in front of a camera, according to an embodiment.

FIG. 10 illustrates a block diagram of an exemplary photoluminescent light source in front of a camera, according to an embodiment. The photoluminescent light source 1008 has an optional mirror 1001 with a hole 1009. The hole 1009 in the mirror is aligned with the lens of the camera 1007 placed behind the mirror. A transparent light source 1002 emanating light of a particular spectrum is placed in front of the mirror. A selective mirror 1003 with a hole 1010 is placed in front of the transparent light source 1002. In an embodiment, the light source 1008 emanates more light in the region where the hole 1010 is present so as to compensate for the loss in efficiency due to absence of the selective mirror 1003 and mirror 1001.

The selective mirror 1003 transmits light of the particular spectrum which is generated by the light source 1002, while it reflects light generated by the photoluminescent material in layer 1004 placed in front of it.

The layer 1004 has photoluminescent material. In an embodiment, the layer 1004 also has transparent material, in which the photoluminescent material may be dispersed or may be disposed in small regions. The layer 1004 may have compartments such as compartment 1011. The layer 1004 may have columnar compartments or an array of compartments. Each compartment may contain photoluminescent material emanating light of a particular spectrum. In an embodiment, light emanated from the photoluminescent material in layer 1004 lies in the visible range of light spectrum. In an embodiment, the compartments may extend into more layers such as 1002, 1003 and 1005. The inter-compartment boundaries such as boundary 1012 may have material that reflects, scatters or absorbs light so that light from a compartment does not enter another compartment. A selective mirror 1005 is placed in front of the layer 1004. Selective mirror 1005 transmits light of the particular spectrum generated by the photoluminescent material in layer 1004, while reflecting light generated by the light source 1002.

Light 1006 depicts exemplary light incident on a face of the apparatus 1099. Light 1006 passes through the selective mirror 1005, the layer 1004, the hole 1010 in selective mirror 1003, the transparent light source 1002 and the hole 1009 in the mirror 1001 and enters the camera 1007, which captures an image. In an embodiment, the light source 1002 is not emanating light when the camera 1007 is capturing an image. In an embodiment, the camera 1007 is not capturing an image when the light source 1002 is emanating light. In an embodiment, optical properties such as transmittance and reflectance of the selective mirror 1003 are varied over its surface such that the selective mirror 1003 is primarily transparent to light incident on the face of the apparatus 1099 in front of the lens of the camera 1007, but primarily reflects light of similar spectrum in other parts of the surface.

Transparent Light Source

Figure 11A:
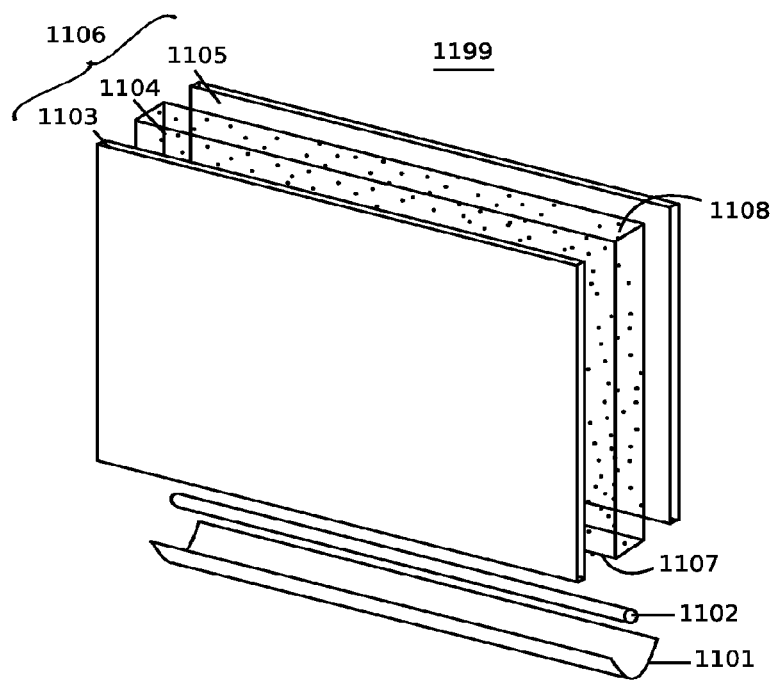
FIG. 11A illustrates a block diagram of an exemplary transparent light source, according to an embodiment.

FIG. 11A illustrates a block diagram of an exemplary transparent light source, according to an embodiment. Light source 1199 is primarily transparent and may be constituted of a light guide 1106 with a core 1104 surrounded by low index cladding 1103 and 1105. In an embodiment, the cladding is air or vacuum. The core 1104 includes diffuser, which is a sparse distribution of light dispersing particles. The diffuser is made up of metallic, organic or other powder or pigment, or transparent particles or bubbles which deflect light by reflection, refraction or scattering. Linear light source 1102 illuminates the light guide from one of its ends 1107. Optional reflector 1101 concentrates light from the linear source 1102 into the light guide 1106. The light from primary light source 1102 travels through the light guide 1106, is dispersed over the entire body of the light guide 1106 and exits the light guide 1106. The light guide 1106 is primarily transparent and clear when viewed from outside.

Figure 11B:
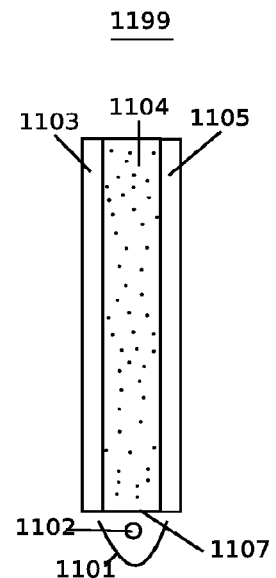
FIG. 11B illustrates a block diagram of an exemplary transparent light source as viewed from the side, according to an embodiment.

FIG. 11B illustrates a block diagram of an exemplary transparent light source as viewed from the side, according to an embodiment. Light source 1199 is primarily transparent and is constituted of a light guide 1106 with a core 1104 surrounded by low index cladding 1103 and 1105. The core 1104 includes diffuser, which is a sparse distribution of light dispersing particles. Linear light source 1102 illuminates the light guide from one of its ends 1107. Light travels in the light guide and gets dispersed over the entire body of the light guide. Optional reflector 1101 concentrates light from the linear source 1102 into the light guide 1106.

Figure 12:
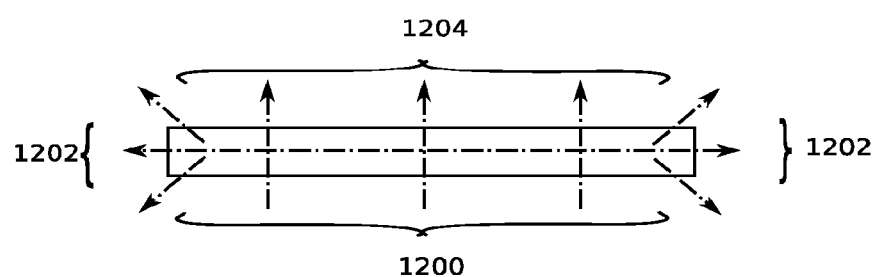
FIG. 12 illustrates a block diagram of an exemplary element of core of exemplary transparent light source, according to an embodiment.

FIG. 12 illustrates a block diagram of an exemplary element of core of exemplary transparent light source, according to an embodiment. Core element 1299 has the thickness and breadth of the core but has a very small height. Light 1200 enters element 1299. Some of the light is dispersed and leaves the light guide as illumination light 1202, and the remaining light 1204 travels on to the next core element. The power of the light 1200 going in is matched by the sum of the powers of the dispersed light 1202 and the light continuing to the next core element 1204. The ratio of the fraction of light dispersed 1202 with respect to the light 1200 entering the element 1299, to the height of element 1299 is the volume extinction coefficient of element 1299. As the height of element 1299 decreases, the volume extinction coefficient approaches a constant. This volume extinction coefficient of element 1299 bears a certain relationship to the diffuser concentration at the element 1299. The relationship permits evaluation of the volume extinction coefficient of core element 1299 from the diffuser concentration of the core element 1299, and vice versa.

As the height of element 1299 is reduced, power in the emanating light 1202 reduces proportionately. The ratio of power of the emanating light 1202 to the height of element 1299, which approaches a constant as the height of the element is reduced, is the emanated linear irradiance at element 1299. The emanated linear irradiance at element 1299 is the volume extinction coefficient times the power of the incoming light (i.e. power of light traveling through the element). The gradient of the power of light traveling through the element 1299 is the negative of the emanated linear irradiance. These two relations give a differential equation. This equation can be represented in the form "dP/dh=−qP=−K" where:

h is the distance of a core element from that end of the core near which the primary light source is placed;
P is the power of the light being guided through that element;
q is the volume extinction coefficient of the element; and
K is the emanated linear irradiance at that element.

This equation is used to find the emanated linear irradiance given the volume extinction coefficient at each element. This equation is also used to find the volume extinction coefficient of each element, given the emanated linear irradiance. To design a particular light source with a particular emanated linear irradiance, the above differential equation is solved to determine the volume extinction coefficient at each element of the light source. From this, the diffuser concentration at each core element of the core is determined. Such a core is used in a light guide, to give a light source of a required emanated linear irradiance pattern.

If a uniform concentration of diffuser is used in the core, the emanated linear irradiance drops exponentially with height. Uniform emanated linear irradiance may be approximated by choosing a diffuser concentration such that the power drop from the edge near the light source to the opposite edge is minimized. To reduce the power loss and also improve the uniformity of the emanated power, opposite edge reflects light back into the core. In an alternate embodiment, another light source sources light into the opposite edge.

To achieve uniform illumination, the volume extinction coefficient and hence the diffuser concentration has to be varied over the length of the core. This can be done using the above methodology. The required volume extinction coefficient is $q=K/(A-hK)$, where A is the power going into the linear light source 1204 and K is the emanated linear irradiance at each element, a constant number for uniform illumination. If the total height of the linear light source is H, then H times K should be less than A, i.e. total power emanated should be less than total power going into the light guide, in which case the above solution is feasible. If the complete power going into the light guide is utilized for illumination, then H times K equals A. In an exemplary light source, H times K is kept only slightly less than A, so that only a little power is wasted, as well as volume extinction coefficient is always finite.

Figure 13:
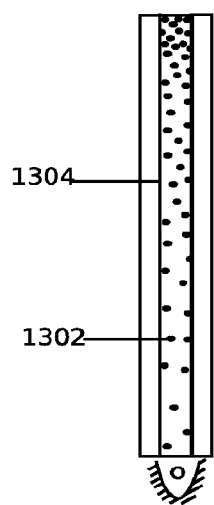
FIG. 13 illustrates a diagram of an exemplary light source having a varied concentration of diffuser particles, according to an embodiment.

FIG. 13 illustrates a diagram of an exemplary light source having a varied concentration of diffuser particles, according to an embodiment. The concentration of the diffuser 1302 is varied from sparse to dense from the light source end of linear light source column 1304 to the opposite end.

Figure 14:
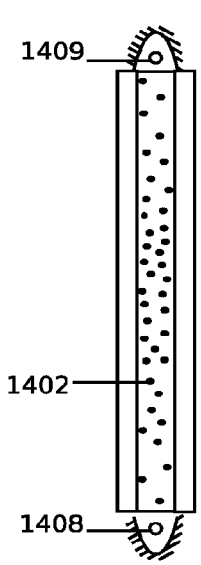
FIG. 14 illustrates an exemplary light source having two light sources, according to an embodiment.

FIG. 14 illustrates an exemplary light source having two light sources, according to an embodiment. By using two light sources 1408, 1409, high variations in concentration of diffuser 1402 in the core is not necessary. The differential equation provided above is used independently for deriving the emanated linear irradiance due to each of the light sources 1408, 1409. The addition of these two emanated linear irradiances provides the total emanated linear irradiance at a particular core element.

Uniform illumination for light source 1499 is achieved by volume extinction coefficient $q=1/\sqrt{((h-H/2)^2+C/K^2)}$ where sqrt is the square root function, ^ stands for exponentiation, K is the average emanated linear irradiance per light source (numerically equal to half the total emanated linear irradiance at each element) and $C=A(A-HK)$.

Figure 15:
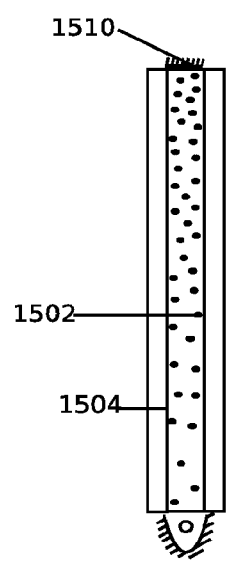
FIG. 15 illustrates a diagram of an exemplary light source having a mirrored core, according to an embodiment.

FIG. 15 illustrates a diagram of an exemplary light source having a mirrored core, according to an embodiment. By using a mirrored core 1504, high variations in concentration of diffuser 1502 in the core 1504 is not necessary. Top edge of the core 1510 is mirrored, such that it will reflect light back into the core 1504. The volume extinction coefficient to achieve uniform illumination in light source 1599 is:

$$q=1/\sqrt{((h-H)^2+D/K^2)}$$

where $D=4A(A-HK)$.

For any system described above (such as the light sources 1399, 1499 and 1599), the same pattern of emanation will be sustained even if the light source power changes. For example, if the primary light source of light source 1399 provides half the rated power, each element of the core will emanate half its rated power. Specifically, a light guide core designed to act as a uniform light source as a uniform light source at all power ratings by changing the power of its light source or sources. If there are two light sources, their powers are changed in tandem to achieve this effect.

Figure 16:
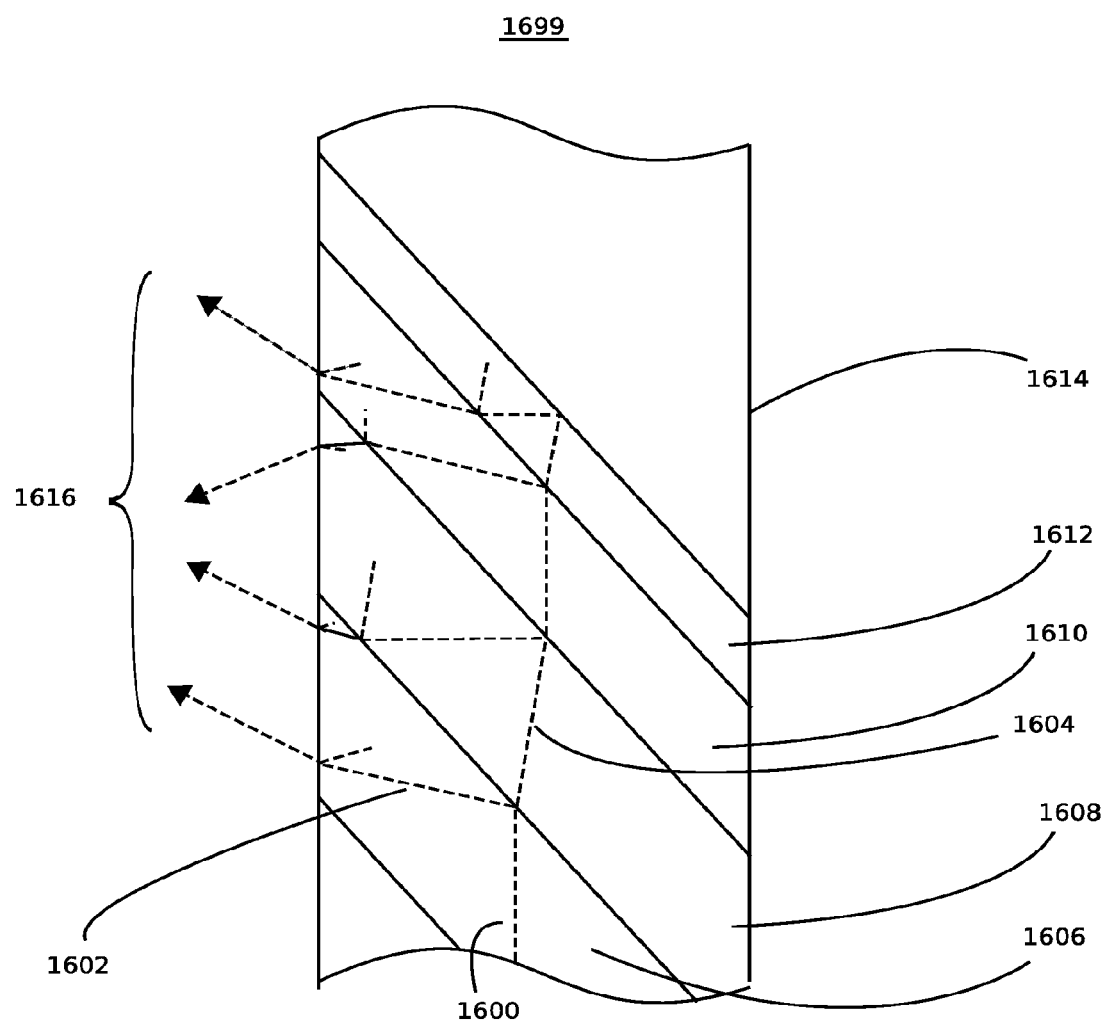
FIG. 16 illustrates a block diagram of an exemplary transparent light source in the form of a surface, according to an embodiment.

FIG. 16 illustrates a block diagram of an exemplary transparent light source in the form of a surface, according to an embodiment. The transparent light source has transparent sheets such as 1606, 1608, 1610 and 1612 having different refractive indices and making a particular angle with the side of light guide 1698. In an embodiment alternate sheets such as the transparent sheets 1606 and 1610 have the same refractive index. In an embodiment, alternate sheets such as transparent sheets 1608 and 1612 have the same refractive index. Exemplary light 1600 is incident on the interface between sheets 1606 and 1608. A part of light 1600 reflects as light 1602 and a part refracts as light 1604 into the next sheet 1608. The intensity of refracted light is less than that of incident light at each interface between the transparent sheets. The light 1600 undergoes one or more internal reflections and refractions and is emanated from the light guide 1699 as light 1616. The thicknesses of the transparent sheets 1606, 1608, 1610 and 1612 are varied according to a particular function of distance from the bottom edge of sheet 1614.

In an embodiment the thicknesses of the transparent sheets is decreased from bottom to top. By varying the refractive indices, slants and thicknesses of the individual sheets 1606, 1608, 1610 and 1612, the emanated light 1616 forms a predetermined light emanation pattern. In an embodiment the emanation pattern 1616 is uniform throughout the sheet. In an embodiment the emanation pattern 1616 is directional and all light emanated from the sheet 1614 is directed in a predefined direction. In an embodiment, the ratios of refractive indices of the adjacent sheets 1606, 1608, 1610 and 1612 are varied according to a particular function of distance from the bottom edge of sheet 1614. According to one embodiment the ratio of refractive indices of the adjacent sheets is increased from bottom to top.

Uses

The present embodiments of a photoluminescent light source may be used as a general purpose lighting source. It may be used as a lighting source in applications such as architectural lighting, theater and movie lighting, lighting for photography, lighting for engineering or lighting for medical and surgical purposes. The photoluminescent light source may be used as a backlight for displays such as liquid crystal displays, which produce images by filtering light from a light source.

Various embodiments disclose multiple compartments in a layer, each compartment having photoluminescent material emitting light of a particular spectrum. The light spectrum emitted by different compartments may be varied over the surface of the light source, so that an image is formed over the surface of the light source. This image may be used as a permanent display. Permanent displays have many uses such as billboards, road signs, directions posted in buildings, advertisements, etc. Furthermore, the picture may be changed only by changing the layer of photoluminescent material. Other layers need not be changed. The photoluminescent light source may be made so that the layer comprising photoluminescent material is easily slid in and out of it, so that the image may be easily changed. The changing of the image may be automated, so that new images are shown periodically, or according to some predetermined program. In an embodiment, the compartments of photoluminescent material may also contain materials that absorb light partly or totally. By varying the amount of light absorbing material in different compartments, variations in image brightness may be achieved. Variations in image brightness may also be achieved by changing the amount of photoluminescent material.

The light spectrum emitted by different compartments may be arranged so as to form a repeating pattern of colors. In an embodiment, a repeating pattern of red green and blue colors is formed. A photoluminescent light source with a repeating pattern of colors may be used as a backlight for transmissive displays such as liquid crystal displays, which display images by filtering light from a light source. The repeating pattern of colored compartments is situated behind a matching repeating pattern of pixels in the display panel. In this way, each pixel produces light of a different color. Using pixels of multiple colors such as red, green and blue colors, any color image may be displayed. In an embodiment, such a display is used in transmissive mode only, and does not have color filters. In another embodiment, the display is used in transmissive as well as reflective mode, known as a transflective display. If a transflective display as described above is made without color filters, it will produce colored images in transmissive and gray scale or unsaturated images in reflective mode. This will give good energy efficiency in both reflective and transmissive modes. If the transflective display as described above is made with color filters, it will produce colored images in both transmissive and reflective mode. Yet, the efficiency will be better than prior systems, since the photoluminescent material in the light source generates a spectrum which is passed by the corresponding color filter.

Figure 17:
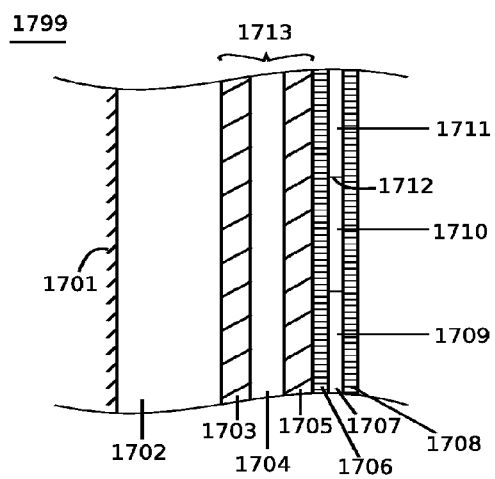
FIG. 17 illustrates a block diagram of an exemplary display system, according to an embodiment.

FIG. 17 illustrates a block diagram of an exemplary display system, according to an embodiment. The display comprises a light source 1702 which emits light of a particular spectrum. An optional mirror 1701 is placed behind the light source 1702. Mirror 1702 may have metallic surfaces, distributed Bragg reflectors, hybrid reflectors, total internal reflectors, omni-direction reflectors or scattering reflectors. A light valve 1713 is placed in front of the light source 1702. In an embodiment, the light valve 1713 has a polarizer 1703, liquid crystals 1704 and polarizer 1705. A selective mirror 1706 which transmits light of the particular spectrum generated by the light source 1702 is placed in front of the light valve 1713. The selective mirror 1706 reflects light generated by the photoluminescent material in the layer 1707 placed in front of it. The layer 1707 of photoluminescent material may have compartments such as compartments 1709, 1710, 1711. The layer 1707 may have columnar compartments or an array of compartments. Each compartment may contain photoluminescent material emanating light of a particular spectrum.

In an embodiment, light emanated from the photoluminescent material in layer 1707 lies in the visible range of light spectrum. In an embodiment, the compartments may extend into more layers such as 1702, 1703, 1704, 1705, 1706 and 1708. The inter-compartment boundaries such as boundary 1712 may have material that reflects, scatters or absorbs light so that light from a compartment does not enter another compartment. A selective mirror 1708 is placed in front of the layer 1707. Selective mirror 1707 transmits light of the particular spectrum generated by the photoluminescent material in layer 1707, while reflecting light generated by the light source 1702. The light valve 1713 controls how much of the light generated by light source 1702 reaches photoluminescent material in layer 1707, thus controlling how much light will be generated at various locations in layer 1707. By controlling the light valve 1713, the display 1799 can show different images. In the case that different compartments in layer 1707 have photoluminescent material emanating light of different spectra, the display 1799 is a color display, each compartment being a pixel of a certain color.

Figure 18:
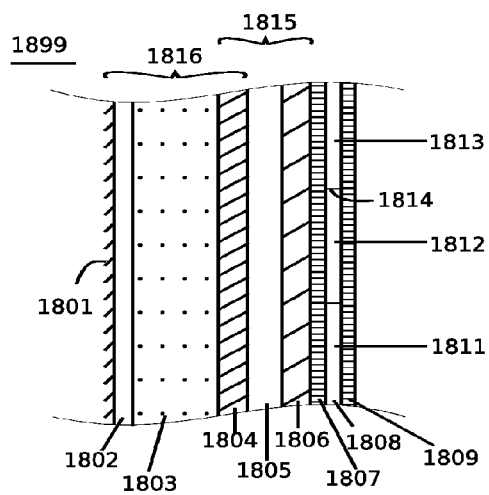
FIG. 18 illustrates a block diagram of another exemplary display system, according to an embodiment.

FIG. 18 illustrates a block diagram of another exemplary display system, according to an embodiment. The display comprises a polarized light source 1816. The polarized light source 1816 has a mirror 1801, a wave retarder 1802, a transparent light source 1803 and a reflecting polarizer 1804. The light source 1803 generates light of a particular spectrum. A light valve 1815 is placed in front of the polarized light source 1816. The light valve modulates light generated by the polarized light source 1816. The light valve has reflecting polarizer 1804, liquid crystal layer 1805 and a polarizer 1806. A selective mirror 1807 is placed in front of the light valve 1815. The selective mirror 1807 transmits light of the particular spectrum generated by the light source 1803. The selective mirror 1807 reflects light generated by the photoluminescent material in the layer 1808 placed in front of it. The layer 1808 comprising photoluminescent material may have compartments such as compartments 1811, 1812, 1813. The layer 1808 may have columnar compartments or an array of compartments. Each compartment may contain photoluminescent material emanating light of a particular spectrum. In an embodiment, light emanated from the photoluminescent material in layer 1808 lies in the visible range of light spectrum. In an embodiment, the compartments may extend into more layers such as 1802, 1803, 1804, 1805, 1806, 1707 and 1809. The inter-compartment boundaries such as boundary 1814 may have material that reflects, scatters or absorbs light so that light from a compartment does not enter another compartment. A selective mirror 1809 is placed in front of the layer 1808. Selective mirror 1809 transmits light of the particular spectrum generated by the photoluminescent material in layer 1808, while reflecting light generated by the light source 1803.

Figure 19:
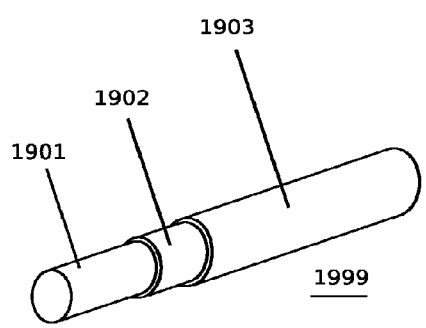
FIG. 19 illustrates a cutaway diagram of a photoluminescent light source, according to an embodiment.

FIG. 19 illustrates a cutaway diagram of a photoluminescent light source, according to an embodiment. The photoluminescent light source 1999 has a light source 1901. The light source 1901 emanates light of a particular spectrum. The light source 1901 may be a transparent object with dispersed light emanating or light dispersing particles. The light source 1901 may be a gas discharge lamp. In an embodiment, light source 1901 is a transparent light source. A layer 1902 of photoluminescent material is placed adjacent to the light source 1901. Photoluminescent material in layer 1902 absorbs light emanated by the light source 1901 and emits light of a particular spectrum. A selective mirror 1903 is placed adjacent to the layer 1902. Selective mirror 1903 reflects light having generated by the light source 1901. The selective mirror 1903 transmits light generated by photoluminescent material in layer 1902. Light from the light source 1901 may make multiple bounces due to selective mirror 1903 before being converted by photoluminescent material to a different spectrum. The photoluminescent light source 1999 is a photoluminescent light source having good energy efficiency, because light which is not converted in a single pass by the photoluminescent material in layer 1902 is reflected and may be utilized instead of emanating out of the photoluminescent light source 1999.

In an embodiment, the light source 1901 is tubular, cylindrical or prismatic in shape. The layers 1902, 1903, and any other layers described herein, may cover the transparent light source 1901 from all sides.

In an embodiment, not all light generated by the light source 1901 is reflected by selective mirror 1903. Light of some wavelengths generated by the light source 1901 may be partially or completely transmitted by the selective mirror 1903.

In an embodiment, a second selective mirror (not shown) is placed between the light source 1901 and layer 1902. This second selective mirror reflects light generated by the photoluminescent material in layer 1902 while transmitting light generated by light source 1901.

A photoluminescent light source is disclosed. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

We claim:

1. An apparatus comprising:
   a light source emanating light of a particular spectrum,
   a layer of photoluminescent material surrounding the light source, and
   a selective minor surrounding the layer of photoluminescent material, wherein
   the photoluminescent material absorbs light of the spectrum emanated by the light source and emanates light of a different spectrum, and
   the selective mirror reflects light emanated by the light source and transmits light emanated by the photoluminescent material.

2. The apparatus of claim 1 wherein the light source is a gas discharge lamp.

3. The apparatus of claim 1 wherein the light source is a light guide with light dispersing particles.

4. The apparatus of claim 3 wherein the light source is a transparent light source.

5. The apparatus of claim 1 wherein the light source is tubular in shape.

6. The apparatus of claim 1 wherein the light source is prismatic in shape.

7. The apparatus of claim 1 further comprising a second selective minor placed between the light source and the layer of photoluminescent material, wherein the second selective minor reflects light generated by the photoluminescent material and transmits light generated by the light source.

8. An apparatus comprising:
   a light source emanating light of a particular spectrum,
   a layer of photoluminescent material surrounding the light source, and
   a selective minor surrounding the layer of photoluminescent material, wherein
   the photoluminescent material absorbs light of the spectrum emanated by the light source and emanates light of a different spectrum,
   the selective mirror reflects some wavelengths of light emanating from the light source, and
   the selective mirror transmits some wavelengths of light emanating from the light source and light emanating from the photoluminescent material.

\* \* \* \* \*